Jan. 19, 1937.　　　G. STARK　　　2,068,575
PHASE UNBALANCE METER
Filed Oct. 17, 1934
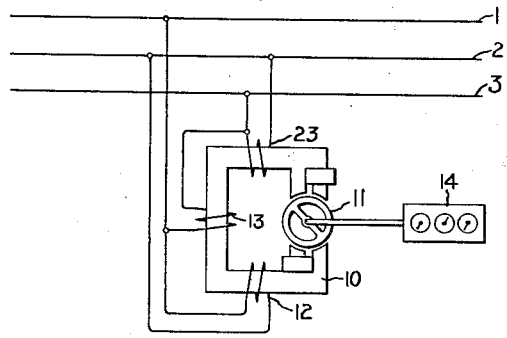
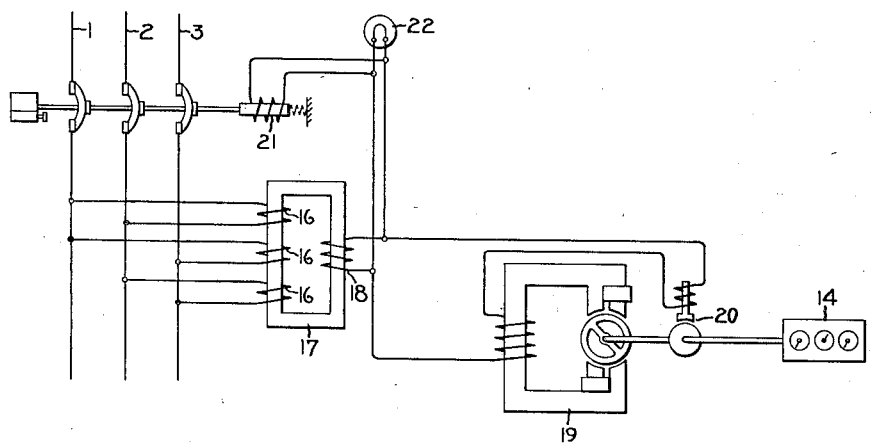
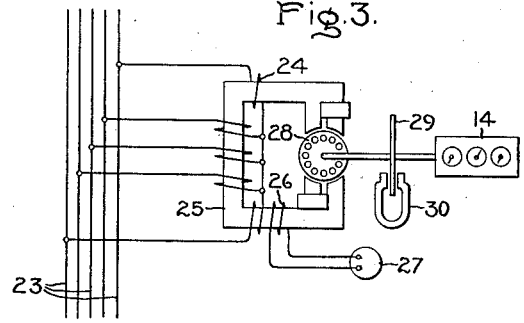
Inventor:
Georg Stark,
by Harry E. Dunham
His Attorney.

Patented Jan. 19, 1937

2,068,575

UNITED STATES PATENT OFFICE 2,068,575

PHASE UNBALANCE METER

Georg Stark, Berlin-Karlshorst, Germany, assignor to General Electric Company, a corporation of New York Application October 17, 1934, Serial No. 748,641
In Germany February 28, 1934

6 Claims. (Cl. 172—245)

My invention relates to apparatus operating in response to voltage phase unbalance and in particular to a meter for integrating the phase-unbalance conditions of power circuits.

In accordance with my invention, I utilize a self-starting synchronous motor which is arranged to be operatively energized in response to the voltage phase unbalance under investigation. The motor is arranged to drive a register so as to integrate the time during which the phase-unbalance conditions exist.

The features of my invention which are believed to be novel and patentable will be pointed out in the claims appended hereto. For a better understanding of my invention, reference is made in the following description to the accompanying drawing illustrating in Fig. 1 one embodiment of my invention for integrating the time of voltage unbalance of a polyphase power circuit; Fig. 2 illustrates an equivalent modified arrangement for integrating the time of voltage unbalance in a polyphase power circuit; and Fig. 3 illustrates a star-connection of the voltage-unbalance metering device to a five-phase power circuit.

In Fig. 1, there is represented at 1, 2, and 3 the lines of a three-phase power circuit where the metering device is connected thereto to integrate the time of voltage unbalance. Here 10 represents the field core structure of a single-phase self-starting synchronous motor such as is commonly used to drive time devices. This core has a single magnetic circuit. The rotor 11 of the motor will be of the usual construction and may, for example, consist of one or more washer-shaped discs of hardened steel with a polar bar across one diameter. The field winding of the motor is unusual in that it consists of three sections, 12, 13 and 23, connected respectively across the phases 1—2, 1—3, and 2—3 of the three-phase power supply.

It will be evident that, if the voltage of the three-phase supply is balanced and the winding sections 12, 13, and 23 are similar, no resultant flux will be produced in the field of the synchronous motor and the motor will remain idle. However, if there exists a phase unbalance, for example, by a partial or complete failure of voltage on one of the phases of the three-phase circuit, a resultant single-phase flux will be produced in the motor field which, if of sufficient magnitude, will cause the motor to start and to operate synchronously with such flux. This resultant single-phase flux will, obviously, have a frequency equal to that of the power circuit and have a magnitude proportional to the voltage-phase unbalance. The motor torque and load will preferably be so proportioned as to cause the motor to start and run synchronously when a predetermined undesirable degree of phase unbalance exists and to stop for lesser degrees of phase unbalance.

The frequencies of most power circuits are sufficiently constant that they may be used to distribute time by means of synchronous-motor driven clocks connected thereto. I utilize this timing feature and cause the motor to drive a suitable integrating register represented at 14, which will then integrate the rotations of the motor and thus sum up or integrate the time of undesirable phase unbalance existing on the power circuit. Such a meter will be useful to the power supply company to provide a check on the phase balance of feeder circuits supplying single-phase and polyphase loads. It will be useful to customers as well as to the power supply company to provide a measure of the time during which a customer undesirably unbalances his polyphase supply circuit, and the measurement may be used when computing the customer's power bill to increase or decrease the power bill in proportion to time of phase unbalance above or below an agreed amount during a month, or on a maximum-demand basis.

In Fig. 2, a modification of the invention is represented for measurement of the voltage unbalance conditions of a three-phase circuit having phases 1, 2, and 3. Here the three phase voltages supply similar primary windings 16 of a transformer. The windings 16 are wound on a common core 17 and a secondary winding 18 on the same core is thus threaded with any single-phase flux resulting from voltage phase unbalance. One or more self-starting synchronous motor-driven meter devices may then be connected to be supplied from the secondary winding 18. This sort of an arrangement will be desirable for voltage phase-unbalance measurements where it is desirable to have the unbalance integrating device located some distance from the power circuit as it requires only a low-voltage single-phase circuit between the transformer, which will be located near the power circuit, and the synchronous driving motor of the phase-unbalance meter. In Fig. 2, a usual form of self-starting synchronous motor 19 is supplied from the secondary winding 18 of the transformer and it will be evident that such motor is energized by a single-phase flux proportional to and equivalent to that existing in the core 17 of the transformer due to any current unbalance in the power circuit.

Motor 19, in addition to driving a suitable register 14, is provided with an electromagnetic brake 20, the winding of which is connected in series with the motor. This brake will be adjusted so as to respond to a definite current corresponding to a selected degree of phase unbalance. For a phase unbalance below that selected, the brake will be on and the motor will be at rest. This is one means of preventing the motor from operating in response to minor phase-unbalance conditions which are not troublesome and which should not be measured with the more serious conditions but which, nevertheless, produce some energization of the motor that might cause it to continue operating after having been started in response to a more serious condition of phase unbalance.

The voltage supplied from the secondary winding 18 of the transformer may also be used for operating other devices, such as a time-delay relay 21 for disconnecting seriously unbalanced loads and a signalling device 22 for giving an alarm when the condition of unbalance reaches a predetermined amount.

In Fig. 3, I have represented a modification where the power circuit 23 to which the device is connected is a five-phase circuit and the coils 24 on the core 25 of the motor are connected in star instead of delta as in Fig. 1. Fig. 3 also shows that the core 25 may, in addition to supplying a resultant single-phase flux for operating the motor, be used as a transformer core to supply energy through a secondary coil 26 to a distant phase-unbalance responsive device, such as a meter, relay, or signal indicated at 27.

In this modification, the motor has an induction motor secondary rotor 28 and is provided with a load consisting of a disc 29 of conducting material rotating in the field of a permanent magnet 30. The speed of this metering device will, therefore, be proportional to the degree of unbalance and the register 14 will provide an integrated measurement of all unbalanced conditions.

It will be evident that although the motor of Fig. 3 has five similar energizing coils 24 and is, therefore, suitable for a five-phase circuit, it may be used in connection with a lower phase number circuit. For example, three of these coils may be energized from a three-phase circuit with the other two coils left open and the resulting flux in its magnetic circuit will be proportional to the phase unbalance of that circuit just as in Fig. 1.

Such other modifications as will occur to those skilled in the art and as come within the true spirit and scope of my invention are intended to be included within the claims appended hereto.

What I claim as new and desire to secure by Letters Patent of the United States is:

1. A voltage phase-unbalance responsive device comprising a magnetic core having a plurality of coils wound thereon, means for connecting said coils for energization from different voltage phases of a polyphase circuit without phase distortion such that no flux is produced in the core when said coils are energized from a balanced polyphase circuit and so that a resultant single-phase flux independent of the direction but proportional to the degree of voltage unbalance exists in the core when said coils are energized from an unbalanced polyphase circuit, an integrating register, and a single-phase motor operated in response to the resultant flux in said core for driving said register.

2. A voltage phase-unbalance responsive device comprising a core structure having a single magnetic circuit, a number of similar coils wound on said core, terminals for energizing different coils thereof from different voltage phases of a polyphase circuit such that, the voltages across the coils are in phase with and proportional to the voltages of such different phases whereby, when energized from an unbalanced polyphase circuit, a resultant flux independent of the direction but proportional to the degree of voltage unbalance is produced in said magnetic circuit, and a self-starting single-phase synchronous motor operated in response to resultant flux in said magnetic circuit.

3. A voltage phase-unbalance meter comprising a core structure having a single magnetic circuit, a plurality of similar coils wound thereon having terminals for connection to different voltage phases of a polyphase circuit such that said coils will be energized in phase with and in proportion to the phase voltages of such polyphase circuit, a single-phase self-starting synchronous motor connected so as to be operated in response to any resultant flux in said magnetic circuit above a predetermined magnitude, and a counter driven by said motor for integrating its operation.

4. A voltage phase-unbalance meter for polyphase circuits comprising a magnetic core structure having a single magnetic circuit, a number of similar exciting coils wound thereon, means for respectively energizing said coils from and in proportion to the voltages of the different phases of a polyphase circuit without phase distortion, a single-phase self-starting synchronous motor connected to be energized in response to the flux in said core structure, and means for preventing the operation of said motor when the flux in said core structure is below a predetermined amount.

5. A voltage phase-unbalance responsive device for polyphase circuits comprising a single magnetic circuit core structure, a number of similar coils wound thereon, means for respectively energizing said coils from and in proportion to the voltages of the different phases of a polyphase circuit without phase distortion, an air gap in said magnetic circuit, and a rotor of a single-phase self-starting synchronous motor in said air gap and responsive to the flux therein, said core structure constituting a stator field structure for such motor.

6. In combination with a polyphase power circuit, means for integrating the time during which the voltage of said polyphase circuit is unbalanced comprising a register and a single-phase self-starting synchronous motor for driving said register, said motor having similar primary energizing coils energized respectively from the different voltage phases of said polyphase circuit without phase distortion.

GEORG STARK.